Dec. 14, 1926.      1,610,586
C. T. PFLUEGER ET AL
AUTOMATIC FISHING REEL
Filed August 13, 1923
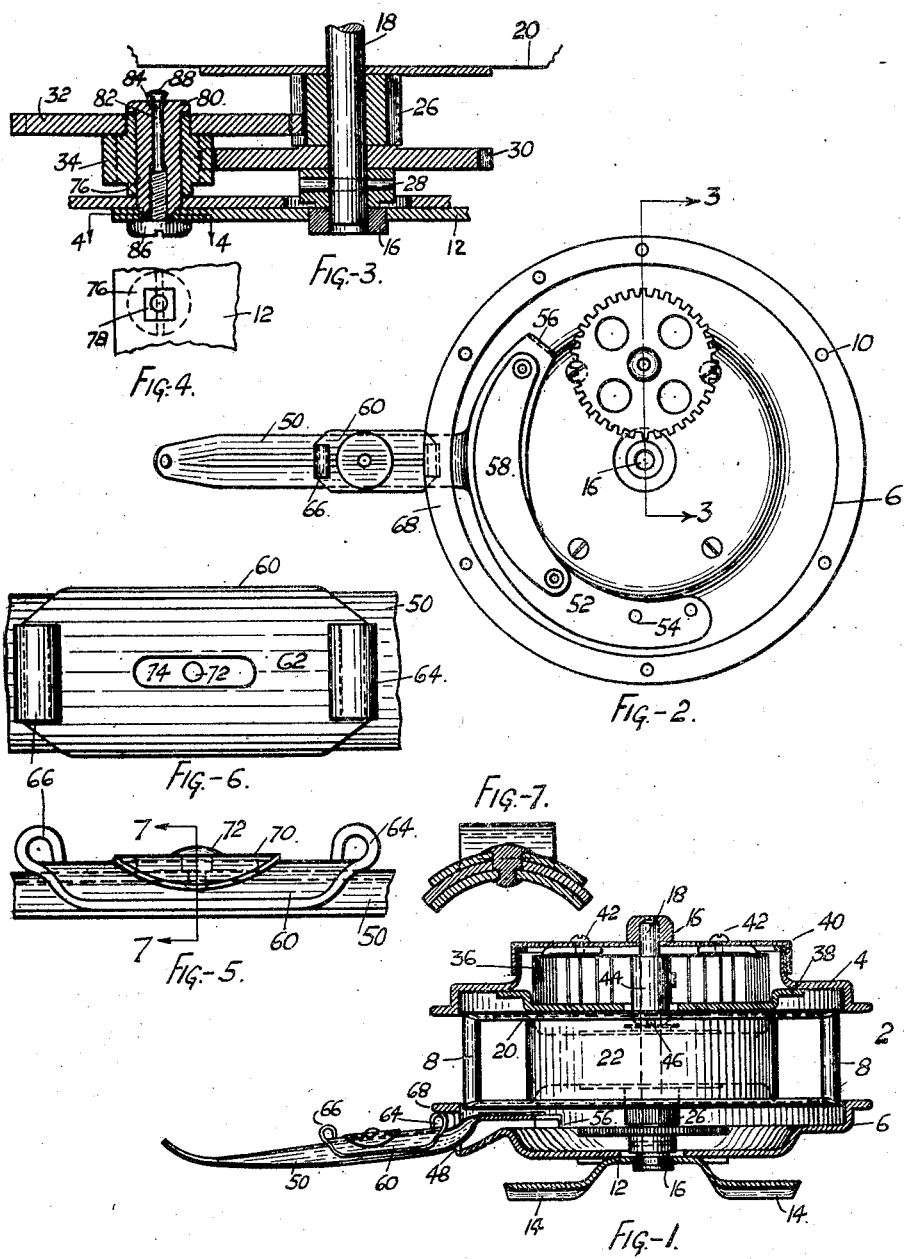
Inventors
CHARLES T. PFLUEGER.
WALTER L. ADAMS.
By     Attorney Patented Dec. 14, 1926.

1,610,586

UNITED STATES PATENT OFFICE.

CHARLES T. PFLUEGER AND WALTER L. ADAMS, OF AKRON, OHIO, ASSIGNORS TO THE ENTERPRISE MANUFACTURING COMPANY, OF AKRON, OHIO, A CORPORATION OF OHIO.

AUTOMATIC FISHING REEL.

Application filed August 13, 1923. Serial No. 657,095

This invention relates to improvements in fishing reels and has particular reference to reels of the automatic type.

A general object of this invention is the provision of an improved fishing reel which can be readily and easily assembled and taken apart without the disturbance or removal of the internal operating parts of the reel such as is required with the standard reels now in use.

A further feature of this invention consists in the provision of a hand controlled brake located in a convenient position on the reel by which the movement of the spool may be controlled, thereby avoiding all slack line and rendering it possible to place a tension on the fish on the end of the line at all times. A further feature of this invention resides in the provision of means for rendering the brake ineffective so that the spool will be free to turn without interference from the brake.

These and other important features of this invention will appear from the following description read in conjunction with the accompanying drawings and will be particularly pointed out in the claims.

In the drawings:

Figure 1 is a cross section of the fishing reel selected to illustrate the invention, showing the parts thereof assembled;

Figure 2 is a plan view of the back plate of the reel;

Figure 3 is a section on the line 3—3 of Figure 2;

Figure 4 is a view along the line 4—4 of Figure 3;

Figure 5 is a side elevation of the brake lever;

Figure 6 is a plan view of the brake lever with the washer and rivet removed; and Figure 7 is a sectional view on the line 7—7 of Figure 5.

The illustrated fishing reel comprises a metallic casing 2 consisting of a front plate 4 and a back plate 6 and a plurality of pillars 8 extending between the front and back plates and binding them together to form a rigid frame. The plates are removably secured to the pillars by means of pillar screws extending through suitable openings 10 in the edges of the plates and adapted to enter threaded openings in the ends of the pillars. Upon the outer face of the back plate 6 is secured a cross plate 12 having oppositely extending upstanding arms 14 suitably curved to receive a fishing pole therein. The plates 4 and 12 are provided with aligned central bushings 16 to receive the axle 18 of a spool 20 mounted for rotation within the casing. The body portion 22 of the spool is provided with an opening, not shown, by means of which the line is attached thereto.

Surrounding the axle 18 and secured to one face of the spool is a pinion 26. Upon the end of the axle and keyed thereto by means of a pin 28 is a gear 30. The pinion 26 and gear 30 mesh respectively with a second gear 32 and a pinion 34 mounted upon the back plate in a manner to be described in detail later, the arrangement constituting a double multiplying gearing for the spool as will be readily understood.

The spool 20 is driven by a spring 36 confined between a spring container 38 and a knurled cap 40 mounted upon the outer face of the front plate 4. The knurled cap 40 and the spring container 38 are connected together by screws 42 and, therefore, rotate as a unit. One end of the spring 36 is secured to the spring container and the other end to a clutch element 44 having a face adapted to engage a pin 46 extending through the spool axle 18 and transmit power from the spring to the shaft.

The description of the reel up to this point has been brief and general in its nature, the described parts being standard in construction and constituting, per se, no part of the present invention. It will be sufficiently clear, however, that turning the knurled cap 40 will cause compression of the spring 36, the expansion of which drives the spool 20 to which the line is connected.

Extending through an opening 48 stamped in the side of the back plate 6 is an arm 50 of an arc-shaped brake 52 having one end fastened to the inner face of the back plate as at 54 and the other end terminating in an outwardly bent flange 56 arranged to bear upon the plate and urge the brake constantly inwardly into engagement with the face of the spool. The inner face of the brake is provided with a friction element 58 of leather or similar material to frictionally engage the spool and lock the latter against rotation by the spring 36.

Mounted for sliding movement upon the arm 50 of the brake is a brake releasing element 60 having a curved body portion 62 similar in contour to the arm 50 and provided at each end with upstanding lugs 64 and 66 preferably formed by bending the ends of the releasing element back upon the body portion thereof. The inner lug 64 constitutes in effect a cam element which upon inward movement will engage the portion 68 of the back plate and cause the brake to be moved out of engagement with the spool and retained in disengaged position, thereby releasing the spool and allowing it to be rotated by the spring 36 in a manner previously described. The brake releasing element 60 is retained in place upon the arm 50 by a spring friction washer 70 and a rivet 72, the releasing element being provided with an elongated slot 74 for the reception of the rivet, the construction allowing sliding movement of the element relative to the arm 50. The outer lug 64 affords a convenient means for the operation of the brake releasing element 60 by the finger of the user.

As previously intimated in the description, this invention also contemplates a novel arrangement and organization of parts to facilitate the assembly and separation of the parts of the reel. To this end, the gear 32 and pinion 34 are mounted upon a gear post 76 having a squared outer end 78 extending through the back plate 6 and a squared opening in the cross plate 12. The post 76 is provided with a retaining flange 80 on its inner end to retain the gear 32 and the pinion 34 on the post. The gear post 76 is provided with a central bore 82 having a countersunk portion 84 at its inner end, a portion of the central bore being screw threaded to engage the threads of a gear post screw 86 extending through the back plate and the bore of the gear post. The inner end of the gear post screw 86 is provided with an enlarged head 88 which is swedged down after the parts are assembled and is adapted to cooperate with the countersunk portion of the gear post and limit the axial movement of the latter in a manner described hereinafter. The arrangement of parts is such that when the reel is assembled the gear post screw 86 will be tightened to hold the gear post rigid and retain the gear and pinion firmly in position. However, due to the fact that the gear post is held against rotation, when the screw 86 is slightly loosened, the gear post may be moved axially allowing sufficient play between the retaining flange of the post and the inner face of the back plate 6 to permit a slight wabbling or loosening of the gear 32 and the pinion 34. This loosening is sufficient to allow the clearance of the gears and the spool may be removed. It will be noted, however, that the axial movement of the gear post 76 will be arrested by the enlarged head 88 of the gear post screw before the squared end of the post has dropped out of the hole in the cross plate, thereby preventing the gear post and gears thereon from becoming separated from the back plate and retaining the parts in a position in which they may be readily and easily assembled.

Since the manner in which the different parts of the device operate to perform their function has been set forth in connection with the detailed description, no further description of the operation is necessary for an understanding of the invention.

Having described the invention, what we claim as new and desire to secure by Letters Patent of the United States is:

1. A fishing reel comprising a frame, a spool within the frame, a spool operating mechanism, a brake within the frame, the brake normally contacting with a face of the spool to prevent rotation by the operating mechanism, an operating arm for the brake extending beyond the frame, and a slide movable on the arm to positions within or outside of the frame, the slide being formed of a strip of metal having a portion bent outwardly to form a cam surface engageable with the frame to move the brake out of contact with the spool.

2. A fishing reel comprising a frame, a spool within the frame, a spool operating mechanism, a brake within the frame, the brake normally contacting with a surface of the spool to prevent rotation by the operating mechanism, an operating arm for the brake extending beyond the frame, and a slide movable on the arm and having a cam surface which may be forced between the frame and the arm to free the brake from contact with the surface of the spool.

3. A fishing reel comprising a frame, a spool within the frame, a spool rotating mechanism, a brake within the frame, the brake normally contacting with a surface of the spool to prevent rotation thereof, an operating arm for the brake extending beyond the frame, and a slide movable on the arm and having one end bent outwardly to form a rounded cam surface which may be forced between the frame and the arm to move the brake away from the surface of the spool.

4. A fishing reel comprising a frame unit, a spool unit, spool operating mechanism, a brake within the frame for normally engaging the spool, an arm integral with said brake extending outside the frame, and means frictionally mounted for sliding movement on said arm, said means provided with a cam surface for moving the arm to disengage the brake.

5. A fishing reel comprising a frame, a removable plate, and a spool, reduction gearing for driving the spool comprising two pairs of intermeshed and overlapped gears, one of said pairs being carried by the spool shaft and the other by the plate and means for permitting displacement of the gears upon the back plate without removal therefrom.

6. A fishing reel comprising a frame, a removable plate, and a spool, reduction gearing for driving the spool comprising two pairs of intermeshed and overlapped gears, one of said pairs being carried by the spool shaft and the other being attached to the plate, the means for attaching the gears to the plate being such as to permit shifting of the gears without detaching them from the plate.

7. A fishing reel comprising a frame unit having two separable ends, a spool unit, operating mechanism for said spool, said mechanism including a spool shaft, a gear on said shaft, a gear post carried by one of said ends, a gear on said post overlapping said first gear, and means for moving said post axially to loosen the gear thereon without removing the post from said end.

8. A fishing reel comprising a frame unit having end members, a spool unit between said members, operating mechanism for said spool including reduction gearing, means for holding said gearing in operative position when the reel is assembled, and adjustable to permit a portion of said gearing to wabble about its axis to allow the reel to be disassembled.

9. A fishing reel comprising a frame unit having separable end members, a spool located between said end members, operating mechanism for said spool including a spool shaft, a gear keyed to one end of the shaft, a pinion adjacent the gear and secured to the spool, a gear post seated in one of the end members, a gear mounted on said post and overlapping the first mentioned gear, and means to hold said gear post rigidly upon the back plate or to allow its movement away from the back plate to a sufficient extent to permit the removal and assembly of the back plate and the positioning of the overlapping gears, without removal of the gear post from the back plate.

10. A fishing reel comprising a frame unit having two separable ends and means for holding the ends together, a spool, means for operating said spool, said means including a spool shaft, a gear on said shaft, a pinion on said spool surrounding said shaft, a gear and pinion mounted on one of said ends adapted to engage the first named pinion and gear respectively, means for normally maintaining said gears and pinions in overlapping relation, and means constructed and arranged to loosen the second named pinion and gear to allow the spool to be removed without the separation of the gear and pinion from the said end.

11. A fishing reel comprising a frame having two separable ends, a cross plate on one of said ends having a keyed opening therein, a spool, operating mechanism for said spool including a spool shaft, a gear on said shaft, a gear post carried by one of said ends and having a keyed end extending within said opening in the cross plate, a gear on said post overlapping said first named gear, and means for moving said post axially to permit the ends and spool to be disassembled without the removal of the gear from the said end.

12. A fishing reel comprising a frame having two separable ends, a cross plate on one of said ends having a keyed opening therein, a spool, operating mechanism for said spool including a spool shaft, a gear on said shaft, a gear post carried by one of said ends and having a keyed end extending within said opening in the cross plate, a gear on said post overlapping said first named gear, means for moving said post axially to permit the ends and spool to be disassembled without the removal of the gear from the said end, and means for limiting the axial movement of said post.

CHARLES T. PFLUEGER.
WALTER L. ADAMS.